April 30, 1946.  R. L. FREAS  2,399,221
SAFETY LANDING DEVICE
Filed Sept. 25, 1942
Fig. 1.
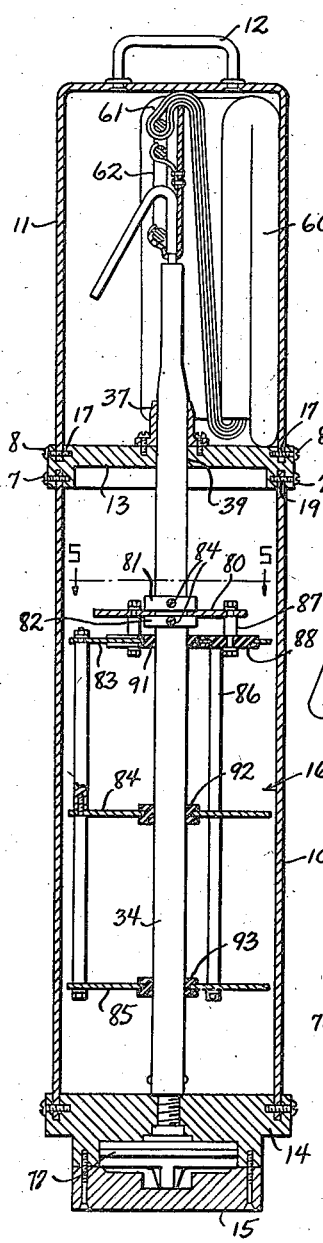
Fig. 6.
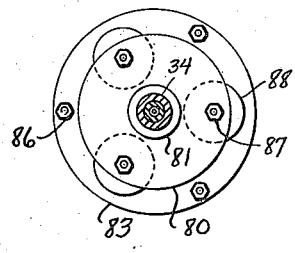
Fig. 5.
Fig. 4.
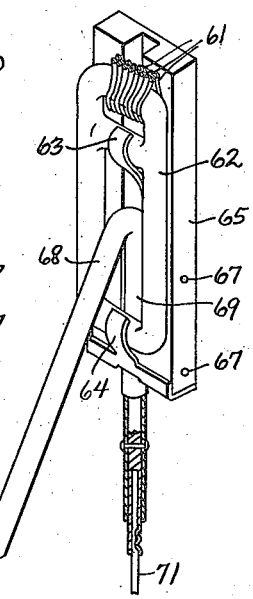
Fig. 2.
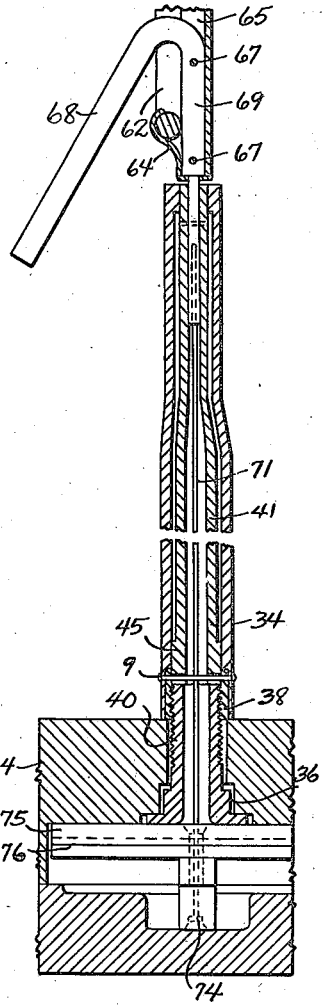
Fig. 3.
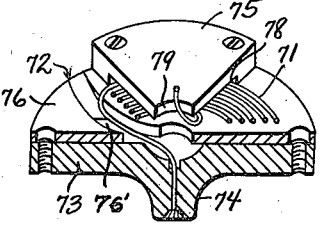
INVENTOR
Raymond L. Freas
BY
ATTORNEY Patented Apr. 30, 1946

2,399,221

UNITED STATES PATENT OFFICE 2,399,221

SAFETY LANDING DEVICE

Raymond L. Freas, Conshohocken, Pa.

Application September 25, 1942, Serial No. 459,644

14 Claims. (Cl. 244—138)

(Granted under the act of March 3, 1883, as amended April 30, 1928; 370 O. G. 757)

This invention relates to safety landing devices and more particularly to a safety landing device for a radio transmitting or receiving apparatus, or other apparatus which is subject to injury by the mechanical shocks resulting from hard landings when the apparatus is dropped from an aircraft to the ground.

In supplying airborne troops with communication equipment or other supplies, it is necessary to drop these supplies from an aircraft. In those instances wherein the equipment to be used by the troops is subject to injury by mechanical shock, it has been fully realized from past experience that particular care must be exercised in the design of a special support or chassis which effectively prevents direct transmission of the landing impact to the delicate apparatus which it houses or supports.

It is also realized that means must be provided to absorb the shock resulting from the sudden deceleration of the apparatus upon the opening of the parachute and that the securing means for said parachute must be releasable upon contact with the earth's surface to prevent the parachute from dragging the apparatus over rough terrain and thereby subjecting it to further possible injury.

It is therefore an object of this invention to provide a compact shockproof support or chassis for a radio apparatus which permits successful dropping of the radio apparatus from aircraft to the ground, as for the use by parachute troops or other troops or persons marooned without communication.

It is also an object of this invention to provide means for securing the parachute to the apparatus adapted to be dropped from the aircraft which operates upon contact of the apparatus with the earth's surface to release the said apparatus from engagement with the parachute.

It is also a further object of this invention to provide shock absorbing means operable upon the opening of said parachute to prevent the sudden shock thus developed from being transmitted directly to the apparatus carried thereby.

Attention is invited to a copending application Serial No. 452,616, filed July 28, 1942, for a Radio drift bomb. This copending application discloses the features of this invention in an apparatus utilized for obtaining the drift angle of an aircraft by means of radio bearings.

In the single and preferred embodiment of the invention disclosed in this application, particular reference is had to the drawing, in which Fig. 1 is a longitudinal cross-sectional view of a radio container and parachute adapted to be dropped from an aircraft;

Fig. 2 is an enlarged cross-sectional view of the friction and inertia means for absorbing the shock developed by the opening of the parachute;

Fig. 3 is a perspective view of a reel containing the cable for supporting the radio container;

Fig. 4 is a detailed perspective view of the parachute releasing mechanism;

Fig. 5 is a plan view taken on line 5—5 of Fig. 1; and

Fig. 6 is a fragmentary enlarged view of the parachute housing showing a bayonet slot for releasably securing the parachute compartment to the compartment containing the radio transmitting apparatus.

Referring now to the drawing and particularly to Fig. 1 which illustrates the general combination of a compartment formed by the cylindrical casing 10 adapted to contain a radio transmitting apparatus and power supply source therefor and a parachute compartment formed by a second cylindrical casing 11. One end of the casing 10 is secured to an intermediate disk-like bulkhead 13 by having its cylinder edge inserted into a complementary peripheral groove 19 formed in the under surface of the bulkhead 13. The screws 7 are threaded through aligned openings formed in the bulkhead 13 and the casing 10 to retain the edge of the casing tightly against a suitable gasket disposed in the bottom of the groove 19 so as to form a water-tight enclosure at the junction of the bulkhead 13 and the casing 10. A plurality of bayonet slots 8' are provided in the edge surface of the second casing 11 so that this casing may be removably secured to the bulkhead 13 by having these slots 8' engage the screws 8 which extend across a groove 17 when the cylindrical edge of the casing 11 is inserted into the said circumferential groove 17.

A disk 14 and cap 15 are secured together and are secured also to the open end of the casing 10 to complete a water-tight enclosure which houses the radio transmitting apparatus. Since the details of the radio transmitting apparatus form no part of the present invention, they are not disclosed. However, in the preferred embodiment of my invention, the radio transmitting apparatus is suitably secured to the concentric disks 83 and 84 of the chassis which is indicated on the drawing at 16. The enclosure formed by the casing 10 houses in addition to the radio transmitting apparatus and the support for the chassis 16 a suitable power pack (not shown) which supplies the necessary electrical energy for the radio transmitting apparatus. While the details of the power pack are not disclosed, I prefer to secure the power pack to the concentric disks 84 and 85 so that the power pack will be supported and retained within the space defined by these two concentric disks.

The support for the chassis is positioned centrally within the casing 10 and comprises specifically a hollow metallic tube 34 into one end of which is inserted a tap threaded collar 38 which is welded or otherwise secured thereto. This end of the tube 34 is then threaded on to the projecting end of the hollow friction bushing 40 positioned centrally within the cavity 36 formed in the disk 14. The tube 34, collar 38 and bushing 40 are retained in place by means of a through pin 9. The other end of the tube 34 projects outwardly through an opening 39 of the bulkhead 13 and is sealed to this bulkhead by means of the collar 37 so as to form a water-tight connection therewith. The tube 34 performs the dual function of providing a support for the chassis 16 and cooperating with the inner tubular member 41 to provide a yieldable means frictionally absorbing the force set up by the sudden deceleration of the radio transmitting apparatus upon the initial opening of the parachute. The inner tubular member 41 has a collar 45 secured to its lower end in frictional engagement with the tubular support 34. When a force sufficient to overcome the total frictional resistance existing between the two members 34 and 41 is set up by the sudden deceleration of the apparatus the inner member 41 will be extended to a position wherein the collar 45 will be jammed firmly into engagement with the inner surface of the supporting member 34 at the swaged portion formed at the upper end thereof.

A parachute 60 is contained within the casing 11 and has its shrouds 61 secured to a shroud ring 62. As illustrated in Fig. 4, the shroud ring 62 is clamped in a fixed position to a channel member 65 by means of spring clips 63 and 64. This channel member 65 is securely fastened to the straight shank portion 69 of the V-shaped hook 68 by means of the through pins 67. The V-shaped hook 68 is secured to the inner tubular member 41. The spring clips 63 and 64 permit the shroud ring 62 to be pulled free of its fixed position on the channel member 65 by the parachute shrouds 61 and into engagement with the hook 69 when the parachute is initially opened. A cable 71 connects the hook 68 with the bottom disk 14 of the enclosing casing 10 so that after the inner tubular member 41 has been fully extended to at least partially absorb the shock produced by the sudden deceleration of the apparatus upon the opening of the parachute, the tensile stress developed therein will be taken up by the cable and transmitted to the bottom of the radio casing assembly. The cable or wire 71 also serves the function of positioning the support below the center of gravity of the radio casing assembly.

A rotatable reel 72 is provided for the cable 71 to contain the coiled cable and permit the cable to be played out without acquiring twists or kinks as the inner tubular member 41 is extended. This reel is clearly shown in Figs. 2 and 3 and consists specifically of an anchoring bar 73 to which the cable 71 is securely fastened. The anchoring bar 73 has a projection 74 which forms a friction bearing surface with the cap member 15. The cable is coiled and contained between the upper and lower disks 75 and 76 in the space provided by the center recess 78 cut out of the under surface of the top disk 75. One end of the cable is led out through the opening 79 formed in the disk 75 to extend upwardly through the interior of the inner tubular member 41 to engage the hook 68 as is clearly shown in Fig. 2. The other end of the cable extends through the curved slot 76' cut in the under surface of the disk 76 and is anchored to the bar 73. Upon withdrawal of the cable 71 from the space 78 formed by the inner disk 76 and the upper disk 75, the entire reel which consists of these two disks and the anchoring bar 73 will be free to rotate about a vertical axis in the space provided by the cap 15 and the bottom disk 14. The flange bushing 40 facilitates rotation of the reel 43 to automatically prevent the twists or kinks from being formed in the cable or wire 71.

Referring again to Fig. 1 wherein the details of the support for the radio transmitting apparatus and the power pack are disclosed, the disk 80 is rigidly attached by means of the collars 81 and 82 to the exterior tubular supporting member 34. The position of the disk 80 may be adjusted axially along the supporting member 34 by means of the set screws 89. The chassis 16 of the radio transmitting apparatus and power pack consists specifically of three concentric disks or plates 83, 84 and 85, each of which is supported so as to be free to move vertically along the tubular supporting member 34. Rubber eyelets 91, 92 and 93 are provided between the tubular support 34 and the concentric disks at 83, 84 and 85, respectively, for the purpose of absorbing shocks and vibration.

The disks are maintained in the illustrated position axially spaced along the tubular supporting member 34 by means of three equally spaced supporting rods 86. Rigidly attached to the disk 80 are a plurality of axially extending rods 87. These rods are secured to the disk 83 by means of the rubber grommets 88 which are set into the disk 83. These grommets permit movement of the chassis 16 axially along the tube supporting member 34 and relative to the disk 80 and prevent the mechanical shock of landing from being transmitted directly to the radio transmitting apparatus which is to be supported on these disks. The disk 85 is also secured to the disk 84 and spaced axially therefrom by means of the spacing rods 86 so as to provide a space for the power pack which comprises the source of electrical energy for the radio transmitting apparatus. It should thus be apparent that a plurality of disks are resiliently and slidably supported in parallel alignment in an adjustable position along the tubular support 34 and that resilient means is also provided for attaching the disks to the adjustable securing means at points which are substantially equi-angularly spaced about the center tubular supporting member.

The operation of the apparatus is as follows:

When dropping the apparatus from an aircraft, the casing 11 is severed from engagement with the casing 10 by turning the handle 12 to disengage the bayonet slot 8' from the screw 8 and to provide a release for the parachute 60. When the parachute 60 opens, the shroud ring 62 is pulled free of the spring clips 63 and 64 and into engagement with the hook 68. The forces set up by the opening of the parachute and the retardation of the casing 10 will be transmitted through the hook 68 to the inner tubular member 41 causing this inner tubular member to be extended upwardly until it engages the swaged portion formed at the free end of the tubular support 34. The forces produced by the deceleration of the casing and apparatus housed therein must of course exceed the total frictional resistance between the tubular support 34 and the inner tubular member 41 or else the tubular member 41 will not extend to at least partially absorb the shock resulting from this sudden deceleration.

The wire or cable 71 is provided for the purpose of relieving the inner tubular member 41 of the stresses developed therein when the member 41 is extended to at least partially absorb the shock produced by the opening of the parachute. Before the parachute is opened and before the inner tubular member 41 has been extended, the cable 71 is coiled within the void space 78 of the reel assembly 72 and has an end secured to the anchoring bar 73 thereof. As the inner tubular member 41 is being extended, however, the cable 71 which is fastened to the upper end of this tubular member is removed from its reel 72 by being played out and run up on the inside of this tubular member. The reel 72 rotates freely about the vertical axes thus preventing the formation of twists or kinks within the cable or wire 71 as the cable is completely uncoiled to take up the force transmitted by the parachute 60 and transmit this force to the anchoring bar 73 positioned at the lower end of casing 10.

After the casing 10 has lighted upon a land surface, the pull of the parachute upon the shroud ring 62 is released and the ring is free to fall by gravity and its inertia over the open end of the hook 68 thus detaching the parachute from the casing 10. The channel member 65 which is secured to the inner end of the tubular member 41 restrains the shroud ring 62 so that it can fall only in one direction, that direction being over the open end of the hook. In this manner, the parachute will be released from its engagement with the casing 10 immediately after the pull of gravity on the ring 62 has been relieved.

In accordance with the patent statutes, I have shown and disclosed the preferred embodiment of this invention with the understanding, however, that I reserve the right to make such changes in the number and arrangement of parts as may be required without departing from the spirit of this invention or the scope of the appended claims.

The invention herein described may be manufactured and used by or for the Government of the United States of America for governmental purposes without the payment of any royalties thereon or therefor.

I claim:

1. A safety landing device for apparatus adapted to be dropped from an aircraft comprising the combination of a tubular casing, closures at each end thereof, a rigid tubular support secured substantially at each end to said closures and extending axially of said casing, a member contained within said tubular support, a hook having a straight shank portion secured to said member, a parachute having shrouds and a shroud ring secured thereto, a channel member, means securing said channel member to said hook with the shank portion thereof lying within said channel, and spring slips secured to said channel member for engaging said ring to releasably retain the said ring in the fixed position on said channel for engagement with said hook when said ring is pulled free of said clips by the opening of said parachute whereby said ring will be free to slide over the open end of said hook after the apparatus has been safely landed by said parachute.

2. A safety landing device for an apparatus adapted to be dropped from an aircraft comprising the combination of a tubular casing adapted to house the said apparatus, separate means closing each end of said casing, a fixed tubular member extending substantially axially of said casing secured at its end portions to each of said means, and passing through a first one of said separate means, a second tubular member contained within the fixed tubular member to frictionally engage the inner surface thereof, a parachute, and means extending through the end of said fixed tubular member passing through the first one of said separate means for securing said second member to said parachute whereby said second tubular member will be extended from the end of said fixed tubular member when the force produced by the deceleration of said apparatus upon the opening of said parachute exceeds the total frictional resistance between said tubular members.

3. The device defined in claim 2 characterized further by the addition thereto of a cable securing an end of said second tubular member to the second one of said separate means and rotatable means for paying out said cable to prevent the formation of twists therein as the second member is being extended.

4. A device for landing apparatus by parachute having shrouds and a shroud ring secured thereto, said device comprising a casing, a hook the shank of which is secured to and extends upward from said casing, means adapted to releasably retain said ring in a fixed position relative to said hook to engage the latter as the parachute opens, and means blocking motion of said ring in any direction other than over the open end of said hook whereby as said casing lands said ring will be free to fall by gravity over the open end of the hook to release said parachute.

5. A safety landing apparatus adapted to withstand the shock of landing by parachute comprising a tubular casing, means for closing each end of said casing, a tubular support extending substantially axially of said casing secured at its end portions to each of said means and passing through one end of said means, means forming a shockproof support for said apparatus adapted to be housed in said casing comprising a plate having a central opening for said tubular support, means suitably securing said plate along the length of said tubular support, a second plate having a central opening for said tubular support, and means resiliently attaching said second plate to said first plate and to said tubular support.

6. The device described in claim 5 wherein said tubular casing and tubular support are cylindrical and said first and second plates are circular.

7. In a safety landing device for apparatus adapted to be dropped from an aircraft, a shockproof chassis for said apparatus comprising a tubular casing, closures for each end of said casing, a rigid support secured substantially at each end of said closures and extending axially of said casing, a first plate having a center opening, means adjustably securing said first plate along the length of said support, a resilient eyelet mounted on and adjustable along the support, a second plate secured at its center portion to said eyelet, and means resiliently attaching said second plate to said first plate in spaced parallel relationship.

8. The device described in claim 7 wherein a second resilient eyelet is adjustably positioned on said support and a third plate is secured to said second eyelet and resiliently attached to said first plate.

9. A device providing a shockproof support for apparatus comprising a plurality of disks having central openings, and a central support resiliently and slidably supporting said disks in parallel alignment, first means adjustably fixed to a portion of said support and second means resiliently attaching said disks to said first means at points spaced substantially equi-angularly about said central support.

10. A safety landing device for apparatus adapted to be dropped from an aircraft comprising in combination a casing adapted to house said apparatus, a tubular member, means securing said tubular member to said casing, a slidable member within said tubular member, said member being frictionally engaged with the inner surface of said tubular member, a parachute including shrouds and a shroud ring, and means connecting said shroud ring to said slidable member whereby the latter will move within said tubular member when the force produced by the deceleration of said apparatus and casing upon the opening of said parachute exceeds the total frictional resistance between said tubular member and the member slidable therein.

11. A safety landing device for apparatus adapted to be dropped from an aircraft comprising in combination a casing for housing said apparatus, a tubular member within said casing, said member extending axially of said casing and protruding through an end wall thereof, a slidable member contained within said tubular member, a parachute having shrouds and a shroud ring secured thereto, a hook having a shank portion and adapted to engage said shroud ring, a channelled member, means securing said channel member to said slidable member with the shank portion of said hook lying within said channel, and spring clip means releasably securing said ring to said channel member whereby said hook will engage said ring when said ring is pulled free of said clip means by the opening of said parachute and whereby said ring will be free to slide over the open end of said hook after said casing has been landed by said parachute.

12. A safety landing apparatus adapted to withstand the shock of landing by parachute comprising in combination a casing, a support rod, said rod being secured within said casing and extending axially thereof, means forming a shockproof support for apparatus adapted to be housed within said casing including a first plate having a central opening for said support rod, means securing said first plate to said support rod, a second plate having a central opening for said support rod, and means resiliently connecting said second plate to said first plate and to said support rod.

13. In a safety landing device for apparatus adapted to be dropped from an aircraft, the combination comprising a casing adapted to house said apparatus, a rigid support secured within and extending axially of said casing, a first plate having a central opening therein through which said support passes, means securing said first plate to said support, a resilient eyelet mounted on said support, a second plate having a central opening therein and secured at its central portion to said eyelet, and means resiliently connecting said second plate to said first plate, said apparatus being adapted to be carried upon said second plate.

14. In a safety landing device for apparatus adapted to be dropped from an aircraft, the combination comprising, a casing adapted to house said apparatus, a support rod secured within and extending axially of said casing, a plate member having a central opening therein through which said support rod passes, first means fixed to a portion of said support, and second means resiliently connecting said plate member to said first means, said apparatus being adapted to be carried by said plate member.

RAYMOND L. FREAS.